Aug. 11, 1964     H. R. BOHANON     3,144,204
CENTRIFUGAL BLOWER WHEEL
Filed Aug. 24, 1962
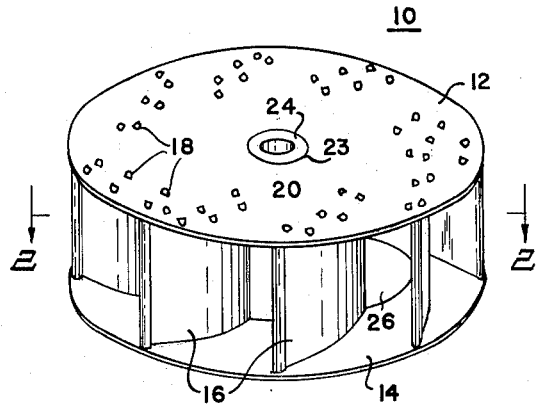
Fig. 1
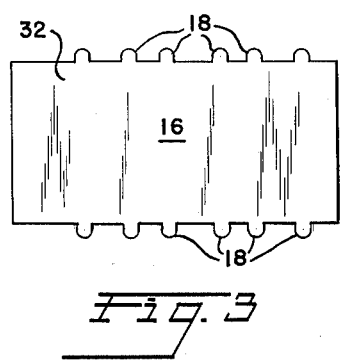
Fig. 3
Fig. 2
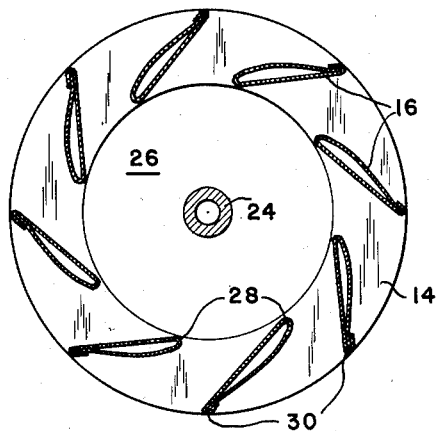
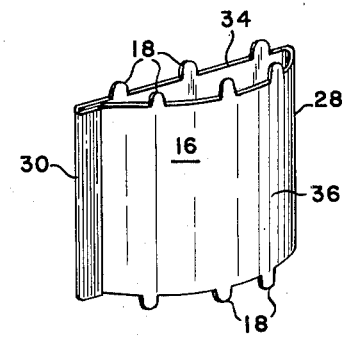
Fig. 4
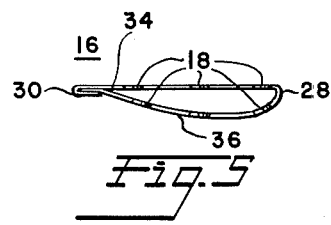
Fig. 5
INVENTOR
Hoy R. Bohanon United States Patent Office 3,144,204
Patented Aug. 11, 1964

3,144,204
CENTRIFUGAL BLOWER WHEEL
Hoy R. Bohanon, Muskogee, Okla., assignor to Acme Engineering and Manufacturing Corporation, Muskogee, Okla., a corporation of Oklahoma
Filed Aug. 24, 1962, Ser. No. 219,233
1 Claim. (Cl. 230—134)

This invention relates generally to centrifugal blower wheels and particularly to a novel construction of such devices having airfoil shaped blades.

Heretofore, in the construction of centrifugal blower wheels, efficiency and low noise levels have been sacrificed for the less efficient, noisier, and inexpensive types of fans. The problems of efficiency and production costs are realized in the construction and manufacture of the blades and the fabrication of the entire fan structure. In an effort to reduce costs, industry has resorted to seemingly inexpensive blade and fan construction with a large sacrifice to the performance of the fan. Such blade shapes as flat or curved sheets of material do not provide the optimum in performance, efficiency, resultant noise, etc., but are employed in an effort to reduce costs.

It is well known in the art that the airfoil is the preferred aerodynamic shape for centrifugal fan blades for reducing vibrations, increasing efficiency, and reducing stressing forces resulting in the practical use of smaller mounting shafts and bearings and smaller rated drive motors. However, the expensive heretofore practiced construction of airfoil bladed fans have made them impractical for most applications. The airfoil shape of the blades requires expensive and complicated machining practices and the joining of the blades to the remaining structure of the fan further requires expensive equipment. In general, the entire construction of airfoil bladed centrifugal fans has been a time consuming, expensive, and difficult task. Therefore, one of two problems have previously always existed in the manufacture of centrifugal blower wheels; either the overall performance of the fan is sacrificed or costs of production are high, depending upon which type of fan blade is employed.

This invention provides structure which eliminates the above mentioned problems by providing a fan having airfoil type blades which are simple in construction and design and inexpensive to manufacture. It is, therefore, an object of this invention to provide an airfoil bladed centrifugal fan which will afford optimum efficiency and performance.

It is another object of this invention to provide a centrifugal blower wheel which will be inexpensive to manufacture and construct.

Another object of this invention is to provide an airfoil bladed centrifugal fan which will have greater strength throughout its structure.

A further object of the present invention is to provide an airfoil bladed centrifugal fan which will be of light weight and sturdy construction.

It is a further object of this invention to provide a centrifugal fan which will have a minimum of vibration and noise during operation.

Yet another object of the present invention is to provide a sturdy centrifugal blower wheel made of lightweight, thin sheet material.

These and other objects of the present invention will be more fully understood from the following detailed description when taken in conjunction with the accompanying drawings in which:

FIGURE 1 is a perspective view of the preferred embodiment showing the invention in its assembled form, FIGURE 2 is a sectional view taken along line 2—2 of FIGURE 1, FIGURE 3 is a plan view of one blade prior to its being folded to provide an airfoil shape, FIGURE 4 is a perspective view of the preferred blade construction, and FIGURE 5 is a top view of the blade shown in FIGURE 4.

Like numerals throughout the various figures designate identical elements and parts of the hereinafter described exemplification of the invention.

In reference to FIGURE 1, there is shown a blower wheel 10 constructed according to the novel structure as set forth in the following description. A front plate 12 and back plate 14 constitute the supporting structures for blades 16. The blades each include at their ends a number of tabs 18 which are better illustrated in FIGURES 3 and 4. The plates 12 and 14 likewise include a corresponding number of slots 20 for receiving the tabs 18. The tabs are bent over and are disposed in surface engagement with the outer surfaces of the plates 12 and 14 thereby providing a positive locking means between the plates and blades 16. A central aperture 22 is provided in plate 12 for receiving a sleeve or shaft 24 therein. The shaft is securely fastened to plate 12 in any suitable fashion and is disposed for receiving the spindle of a drive motor (not shown) for imparting movement to blower wheel 10. A central opening 26 is provided in plate 14 for passage of fluid therethrough.

The relative position of blades 16 are better shown in FIGURE 2. The blades include a rounded surface 28 as the leading edge of the blade to the fluid and a wedge like edge 30 as the trailing edge of the blade. Blades 16 are angularly disposed at a predetermined angle from a radial position which constitutes the optimum angle for the particular application of the blower wheel. The hollow airfoil configuration of blades 16 as can be seen in FIGURE 2 provides greater strength between plates 12 and 14 than would a single sheet of material. Also, such a configuration is of great advantage in resisting the binding moment that results from the centrifugal load when the wheel is rotated. Tabs 18 carry the centrifugal load by shear into plates 12 and 14 and are so sized as to be able to resist this stress.

FIGURE 3 shows blade 16 in its form prior to bending to an airfoil shape. Blade 16 is shown as a sheet of material 32 having tabs 18 extending from two opposite sides thereof. The sheet is bent to form the airfoil shape shown in FIGURE 4 wherein wedge like edge 30 constitutes one end of sheet 32 folded over the other end thereof in a tight fitting relationship. It is to be understood that edge 30 may be formed by lapping the two ends and welding them together or by any suitable means which will produce the wedge like shape. In the preferred exemplification shown herein, a flat surface 34 and a curved surface 36 are provided for the airfoil shape of blade 16. Edge 30 is better shown in FIGURE 5 wherein one end of sheet 32 is folded over an opposite end thereof to form a wedge.

Plates 12 and 14 and blades 16 are preferably constructed of a thin metal sheet. Slots 20 are punched into plates 12 and 14 and arranged in groups at respective stations on the surface of the plates. The blade as shown in FIGURE 4 has its tabs 18 in the unassembled position. Each blade is secured first to one of the plates at a respective station by inserting all the tabs thereof into a respective group of slots 20 and bending them to provide surface engagement with the outer surface of the plate. The other plate is then secured to blade 16 in a similar manner.

Although the above described exemplification has illustrated a form of the invention in which plates 12 and 14 are in parallel planes which constitutes the simplest construction, it is to be understood that any other form, and in particular any surface of revolution about the axis of rotation of wheel 10 may be employed for the plane of the plates. Curved plates may also be employed with correspondingly shaped blades.

The invention is not intended to be restricted to the particular embodiment exemplified and shown in the above drawings and description and it is, therefore, to be understood that within the scope of the appended claim the invention may be practiced otherwise than as specifically described.

I claim:

A medium specific speed centrifugal blower wheel for use in roof exhausters comprising:

(A) a first circular sheet metal plate having a central opening therein and a plurality of slots arranged in a first set of groups at respective stations between the periphery of said plate and said opening;

(B) a second circular sheet metal plate spaced from said first plate and lying in a plane parallel thereto, said second plate having a central aperture which together with said central opening of said first circular plate define the axis of rotation of said centrifugal blower wheel, a cylindrical sleeve received in said central aperture and secured to said second plate at the periphery of said central aperture, said second plate having a plurality of slots arranged in a second set of groups at respective stations corresponding to said slots of said first set of groups of said first plate;

(C) a plurality of sheet metal blades extending between the periphery of said first and second plates and said central opening and said central aperture respectively, said plurality of blades being arranged in continuous sequence around the peripheries of said first and second plates at pre-determined angles thereto, said blades including (1) substantially rectangular sheets folded near their mid portions thus defining side portions which are displaced from each other at points intermediate the trailing ends thereof, said side portions further being displaced from each other so as to define cross-sectional areas being equal at successive points between said first and second plates thus providing said blades with a hollow air-foil configuration;

(2) said trailing ends of said blades including first edges that are folded over to form lap joints and second edges contained securely therein; and (3) said side portions of said blades further including a plurality of tabs, said tabs corresponding to and being inserted through said slots of said first and second groups of first and second plates respectively, said tabs further being bent adjacent said first and second plates to rest in engaging relation therewith.

References Cited in the file of this patent

UNITED STATES PATENTS

| | | |
|---|---|---|
| 1,246,090 | Hagen | Nov. 13, 1917 |
| 2,138,814 | Bressler | Dec. 6, 1938 |
| 2,767,906 | Doyle | Oct. 23, 1956 |

FOREIGN PATENTS

| | | |
|---|---|---|
| 537,282 | Great Britain | June 16, 1941 |
| 656,336 | Great Britain | Aug. 22, 1951 |
| 720,956 | Great Britain | Dec. 29, 1954 |